US008359182B2

(12) United States Patent
Niu et al.

(10) Patent No.: US 8,359,182 B2
(45) Date of Patent: Jan. 22, 2013

(54) METHODS AND SYSTEMS FOR EVALUATING THE PERFORMANCE OF MEMS-BASED INERTIAL NAVIGATION SYSTEMS

(75) Inventors: Xiaoji Niu, Shanghai (CN); Sameh Nassar, Calgary (CA); Naser El-Sheimy, Calgary (CA)

(73) Assignee: UTI Limited Partnership, Calgary (CA)

(*) Notice: Subject to any disclaimer, the term of this patent is extended or adjusted under 35 U.S.C. 154(b) by 785 days.

(21) Appl. No.: 12/109,923

(22) Filed: Apr. 25, 2008

(65) Prior Publication Data

US 2009/0319228 A1    Dec. 24, 2009

Related U.S. Application Data

(60) Provisional application No. 60/926,401, filed on Apr. 25, 2007.

(51) Int. Cl.
| G06F 11/30 | (2006.01) |
| G06F 7/00 | (2006.01) |
| G01D 18/00 | (2006.01) |
| G01C 25/00 | (2006.01) |
| G01P 15/00 | (2006.01) |

(52) U.S. Cl. ........ 702/182; 702/104; 702/116; 702/141; 701/30.6

(58) Field of Classification Search .............. 702/33–35, 702/57, 92–96, 99, 104, 113, 116, 141, 142, 702/145, 150, 182, 183; 701/213–214, 220–221, 701/29–35

See application file for complete search history.

(56) References Cited

U.S. PATENT DOCUMENTS

| 5,969,672 A * | 10/1999 | Brenner .................. 342/357.29 |
| 6,254,204 B1 * | 7/2001 | Hara et al. ..................... 303/183 |
| 6,473,034 B2 * | 10/2002 | Lin et al. .................. 342/357.59 |
| 6,498,996 B1 * | 12/2002 | Vallot ........................... 702/104 |
| 6,859,700 B2 * | 2/2005 | Bolzmann et al. ............. 701/34 |
| 7,526,402 B2 * | 4/2009 | Tanenhaus et al. .......... 702/151 |
| 2004/0066371 A1 * | 4/2004 | Huang .......................... 345/163 |

* cited by examiner

*Primary Examiner* — Michael Nghiem
*Assistant Examiner* — Ricky Ngon
(74) *Attorney, Agent, or Firm* — Fulbright & Jaworski LLP

(57) ABSTRACT

Disclosed are systems and methods for evaluating the navigation performance of MEMS inertial sensors. The method uses MEMS inertial sensors static data signals to estimate the static sensor errors and combines them with a reference kinematic signal obtained through field testing of a high-grade inertial sensor. Such emulated field data may then be processed with the corresponding GPS data collected in the same or different field test to evaluate the navigation performance of the MEMS inertial sensors.

26 Claims, 9 Drawing Sheets

METHODS AND SYSTEMS FOR EVALUATING THE PERFORMANCE OF MEMS-BASED INERTIAL NAVIGATION SYSTEMS

CROSS REFERENCE TO RELATED APPLICATIONS

This application claim benefit of the U.S. Provisional Application Ser. No. 60/926,401, filed on Apr. 25, 2007, which is incorporated by referenced herein.

TECHNICAL FIELD

This invention relates to the field of navigation systems and more particularly to the testing of micro-electro-mechanical systems (MEMS) inertial navigation systems.

BACKGROUND

The integration of the Global Positioning System (GPS) and the Inertial Navigation System (INS) has been implemented for several years due the complementary features of both systems. GPS technology can provide positioning solutions with long-term stability using the line-of-sight signals from receiver to the GPS satellites. However, GPS suffers from the interrupt and degradation caused by all kinds of disturbances of the satellites signals. On the contrary, INS is a self-contained system that can provide a continuous navigation solution (position, velocity and attitude) from a given initial status, but has long-term unbounded drift errors. Therefore, GPS and INS are often combined (especially when using low-cost systems) as an integrated navigation system with other sensors. Due to the complementary characteristics of GPS and INS, such an integrated system requires less accurate INS for general navigation applications, and thus, the limitations due to price, availability and access restrictions of higher grade (navigation or high-end tactical) Inertial Measurement Units (IMUs) are minimized.

Essentially, inertial sensors are making use of the inertia of the proof mass in the sensors. The larger the mass, the better the performance. This fact constitutes the reason why typical Micro-Electro-Mechanical Systems (MEMS) inertial sensors have relatively poor quality compared to traditional sensors. Furthermore, due to the low-cost and bulk productivity of the MEMS sensors, the manufacturers are not able to calibrate each individual sensor. In addition, manufacturers also do not give comprehensive specifications of the sensors in terms of navigation performance which is a major demand for any user. Therefore, the evaluation of MEMS sensors and the corresponding MEMS IMUs in terms of navigation performance is extremely important to the user of such systems. There are several conventional methods to make such an evaluation.

One such method is lab testing which can provide sensor parameters such as noise density, bias instability, Scale Factor (SF) instability, non-orthogonality, non-linearity, g-sensitivity of gyroscopes, and temperature sensitivities (bias and SF). However this method cannot directly predict the navigation performance of the inertial MEMS. The navigation performance can be predicted theoretically by analyzing the error propagation in the INS mechanization and the steady state of the Kalman Filter (KF). In this case, only the sensors errors that are modeled by the KF can be considered (e.g. white noise, bias instability and SF instability). The navigation errors induced by other errors cannot be typically investigated. Therefore the results of such analyses are poor representation of the actual navigation cases.

Another conventional method includes using an INS simulator to simulate the true angular rate and specific force (i.e. the ideal outputs of the gyros and accelerometers according to the motions assigned by users). The errors of the inertial sensors are simulated (according to the specifications or the lab testing) and then added to the true signals to get simulated IMU signals. These signals are processed by the GPS/INS navigation algorithm to investigate the navigation performance. This method is more realistic than lab testing of the sensors. However, both the body motion and the sensor errors are simulated, and these parameters typically differ from the actual values. Moreover, some sensor errors are difficult to model and simulate, such as non-linearity and temperature sensitivities. Furthermore, GPS signals need to be simulated as well.

A third conventional method is field testing. GPS/INS field testing is the only way to evaluate the performance of MEMS IMUs in a realistic situation, especially when GPS signals are temporarily blocked. The advantage of field testing method is that the vehicle motion, sensor errors and GPS signals are all real. The disadvantage of field testing is that the method is frequently time consuming and costly to perform. It is even more expensive and time-consuming to make comprehensive tests that cover a variety of trajectories and GPS signal conditions. Furthermore, a higher grade (navigation or high-end tactical) IMU is necessary to investigate the errors of the tested MEMS IMU, which will further increase the cost and complexity of the test.

OVERVIEW

It has been recognized by the applicants that field testing is currently the most realistic way to evaluate the actual navigation performance while the lab testing and the INS simulator methods are efficient and flexible for error analysis. To evaluate the MEMS inertial sensors, it is not practical to test each MEMS inertial sensor or IMU in the field. On the other hand, the evaluated navigation performance by the lab testing or the INS simulator methods often has some gaps compared to the real results. This is especially true given the fact that the MEMS inertial sensors have larger errors and are more complicated to model. Therefore, the main objective of the invention is to develop an efficient and realistic technique for evaluating the navigation performance of any MEMS inertial sensors, such as accelerometers and gyroscopes used in MEMS IMUs.

Accordingly, disclosed is a novel emulation technique for evaluating the navigation performance of MEMS inertial sensors. The emulation technique uses inertial sensors static data signals to estimate the static sensor errors and combines them with a reference kinematic signal obtained through field testing of a high-grade inertial sensor. Such emulated field data may then be processed with the corresponding GPS data collected in the same or different field test to evaluate the navigation performance of the MEMS inertial sensors. The static inertial signals may be collected in the lab under simulated field conditions to accommodate for the actual temperature variations, especially when the MEMS sensors are sensitive various environmental conditions.

In one example embodiment, a method for evaluating performance of MEMS inertial sensors includes field-testing a reference inertial sensor to generate reference field-test data. The method further includes lab-testing a plurality of MEMS inertial sensors to generate static error data for each tested MEMS inertial sensor. The method further includes combining the reference field-test data with the static error data for each MEMS inertial sensor to obtain emulated field data for each MEMS inertial sensor. The method further includes processing the emulated field data for each MEMS inertial sensor with GPS field data to evaluate performance of the MEMS inertial sensors.

BRIEF DESCRIPTION OF THE DRAWINGS

The invention may be best understood by referring to the following description and accompanying drawings that are used to illustrate embodiments of the invention.

In the drawings.

DETAILED DESCRIPTION OF EXAMPLE EMBODIMENTS

Figure 1:
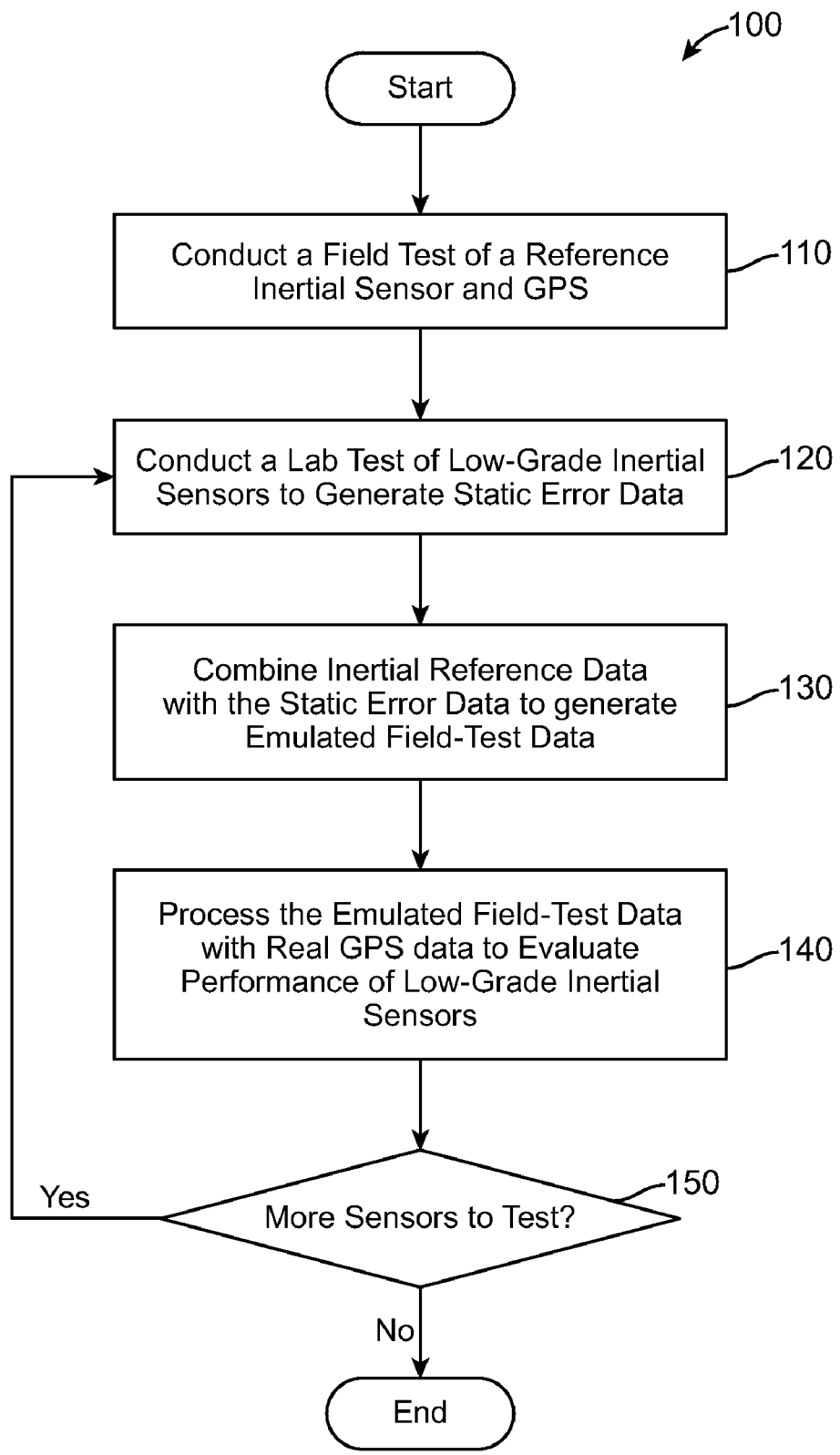
FIG. 1 illustrates a flow diagram of one example embodiment of a process for evaluating the performance of MEMS inertial sensors.

Those of ordinary skill in the art will realize that the following detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice the present invention. In other instances, well-known computing systems, electric circuits and various data collection devices are shown in block diagram form to avoid obscuring the present invention. In the following description of the embodiments, substantially the same parts are denoted by the same reference numerals.

In the interest of clarity, not all of the features of the implementations described herein are shown and described. It will, of course, be appreciated that in the development of any such actual implementation, numerous implementation-specific devices must be made in order to achieve the developer's specific goals, wherein these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1. depicts one example embodiment of a method for evaluating the performance of MEMS inertial sensors, such as accelerometers and gyroscopes used in inertial measurement units (IMU), and other types of inertial navigation systems (INS). Process 100 begins at step 110 in which a field test on a reference inertial sensor may be conducted. In one example embodiment, the reference inertial sensor may include a high-quality or high-grade inertial sensor, such as a navigation-grade or tactical-grade IMU. The field test of a high-end inertial sensor produces a high-quality real kinematic inertial signal that may be used as a reference signal for testing low-grade static and dynamic MEMS inertial sensors as will be described in a greater detail hereinbelow.

Figure 4:
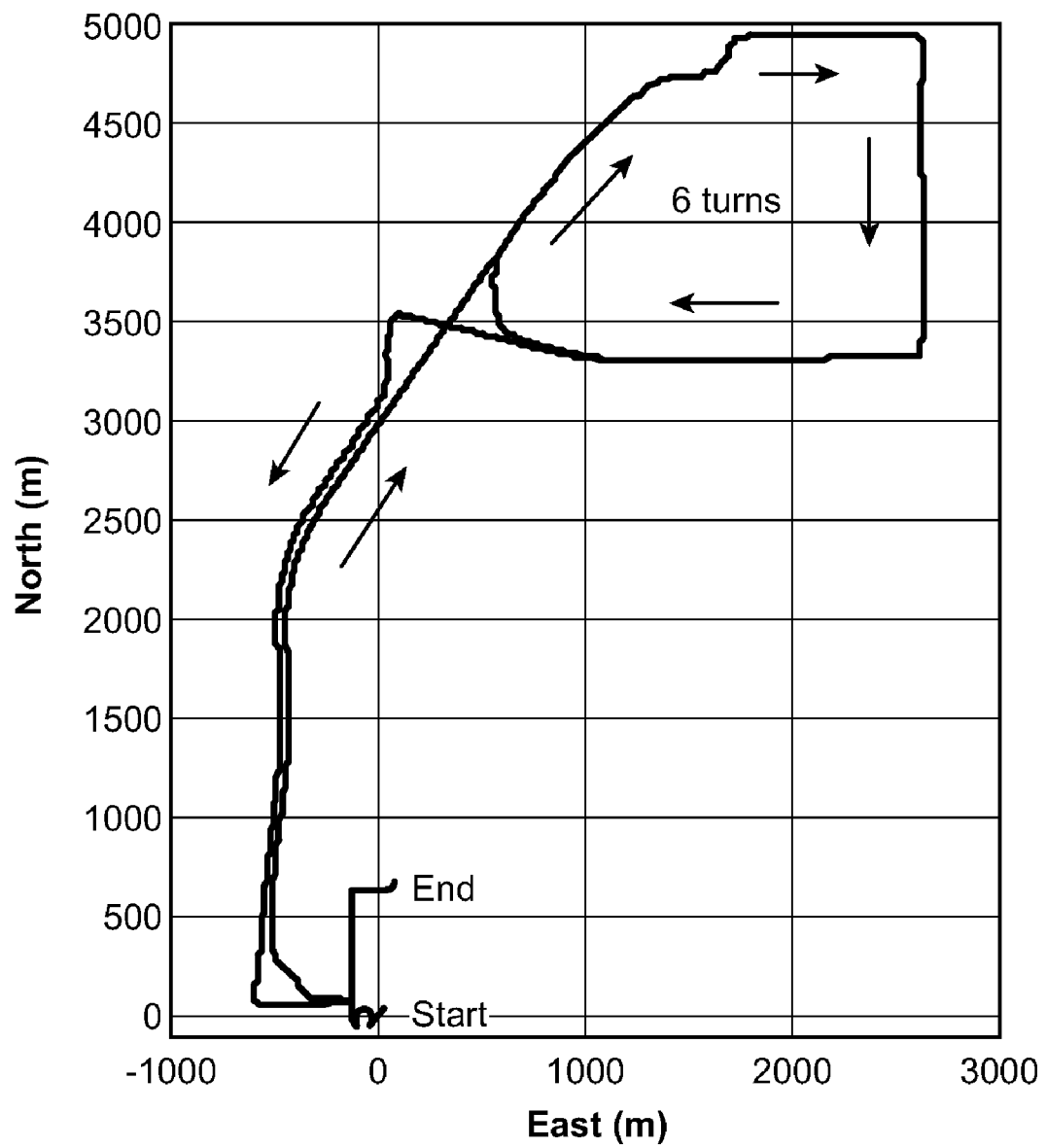
FIGS. 4, 5 and 6 illustrate example driving trajectories of various field tests.
Figure 5:
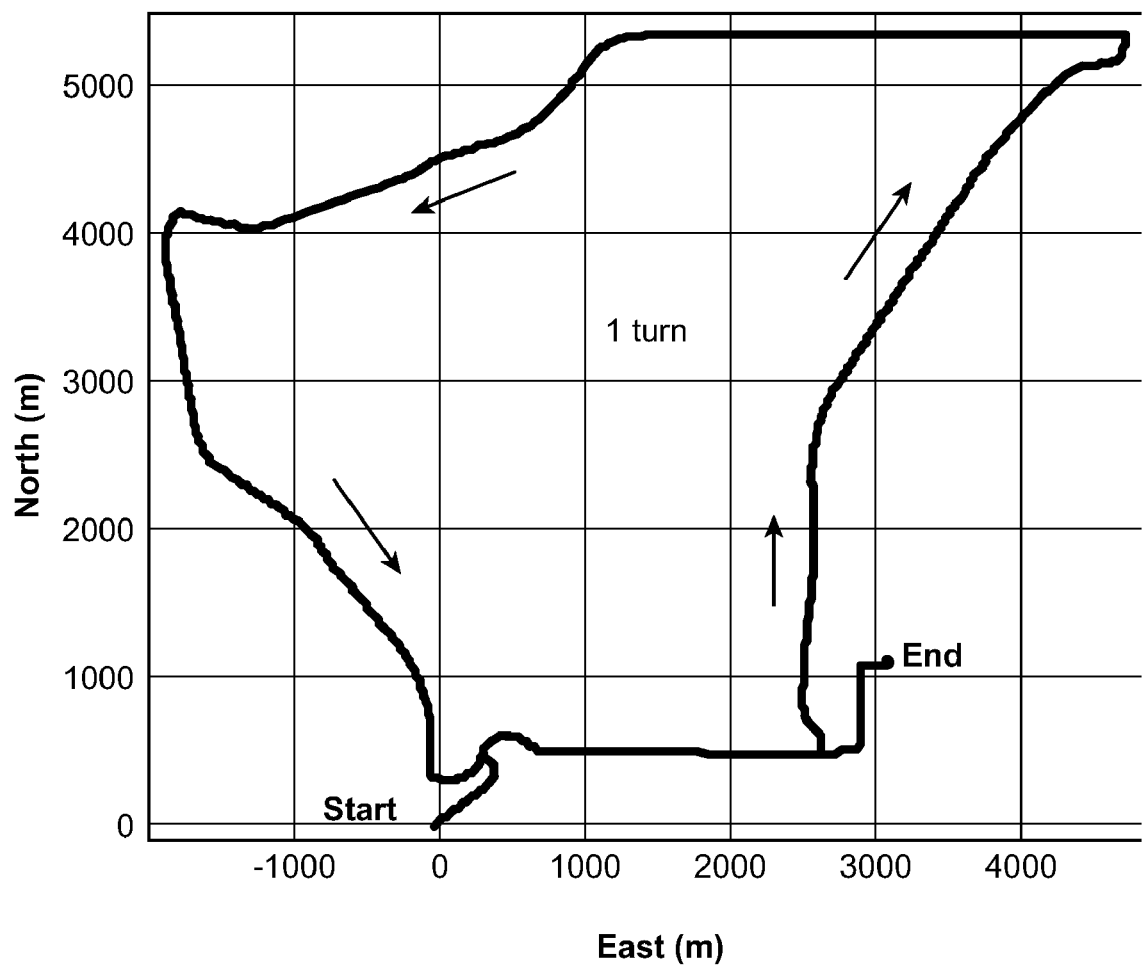
Figure 6:
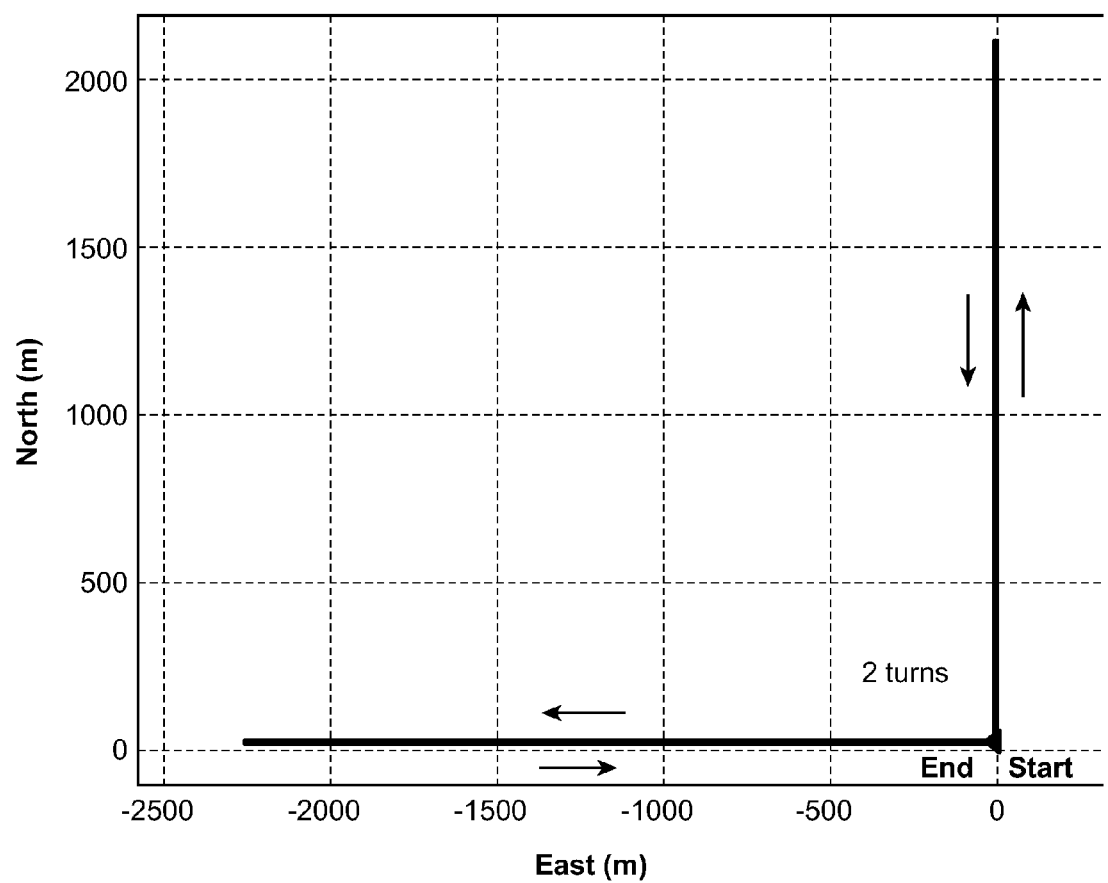

As known to those of ordinary skill in the art, a typical field test may include installing the reference inertial sensor and a GPS unit on a test vehicle and driving around in a predetermined trajectory. FIGS. 4, 5 and 6 depict driving trajectories of various field tests that may be conducted in various example embodiments. In one example embodiment, the field test may cover a variety of trajectories, different driving conditions and various GPS signal conditions. It is desirable that the driving trajectories simulate typically urban, rural and highway environments to provide a variety of reference signals. It also desirable to have varied GPS signal conditions with long and short GPS outages. It is also desirable to expose the reference inertial sensor to varied temperature conditions. The benefit of such field tests is that the collected data represents real driving conditions, including real vehicle motion, sensor errors, GPS signals outages and other.

At step 120, a plurality of low-grade static MEMS inertial sensors are lab-tested to generate long-term static signals, which are used to represent MEMS sensor static errors. In one example embodiment, the testing of static MEMS sensors may be performed for a period longer than the duration of the field-test performed on the reference inertial sensor at step 110. It should be noted that the performance of static MEMS inertial sensors may be tested in a variety of temperature settings to account for the actual temperature variation similar to the actual field environment. Such tests may be performed in a temperature room or outdoors with MEMS sensors being wind-shielded and unshielded to mimic the temperature change in the actual field conditions.

In one example embodiment, in addition to static lab-testing, the testing may include dynamic testing of MEMS inertial sensors. The result of the dynamic tests include dynamic (or kinematic) errors of the tested MEMS inertial sensors. In one example dynamic lab test, MEMS sensors may be placed on a turntable, which may be used to explore operation of the sensors in a wide ranges of motion. The results may be assembled in a look-up table, such as sensor output vs. true motion. Dynamic error of the MEMS inertial sensors may then be determined (e.g., using the look-up table, with interpolation if necessary). In one example embodiment, such dynamic errors may be based upon "true motion" at each epoch or using other known methods. Inclusion of the dynamic sensor errors may improve the performance evaluation of MEMS IMUs.

Figure 2:
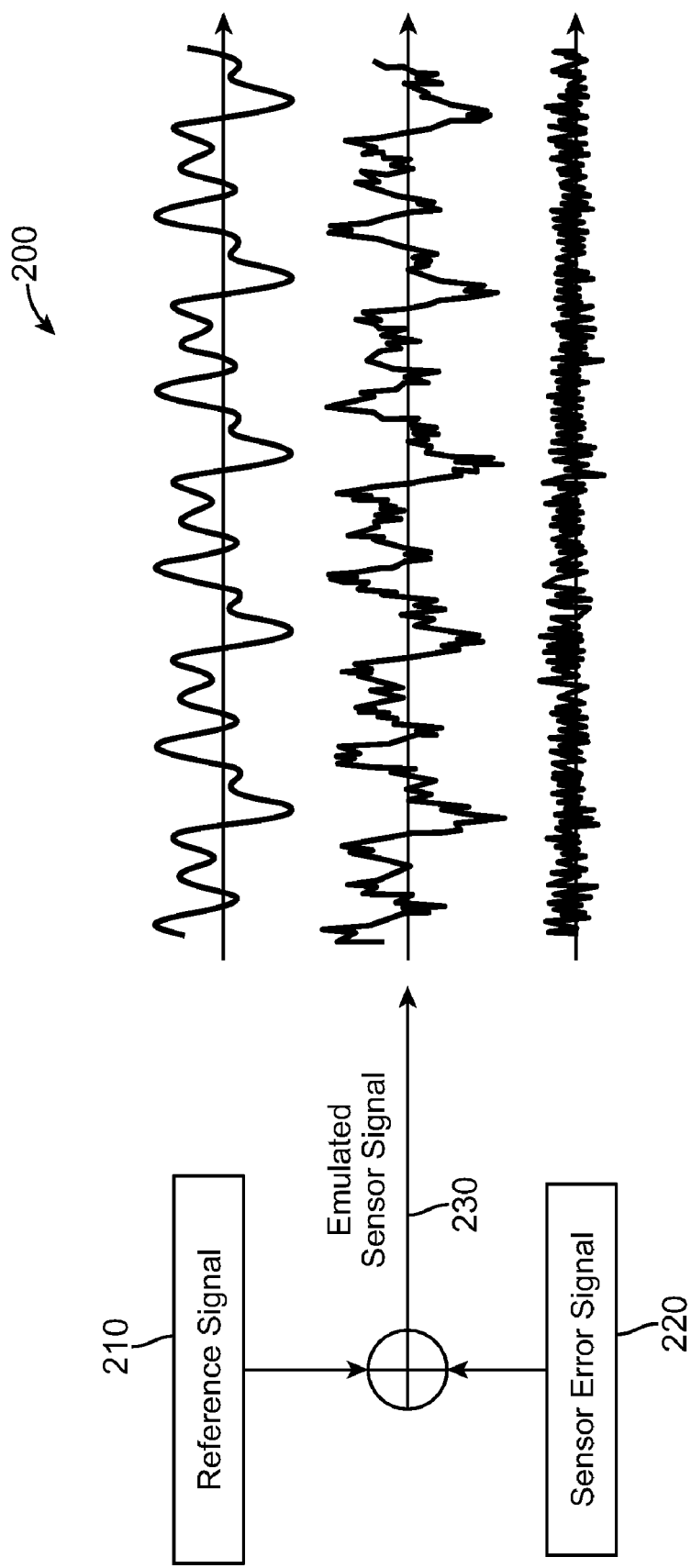
FIG. 2 illustrates a schematic diagram of one example embodiment of a technique for evaluating the performance of MEMS inertial sensors.

At step 130, the MEMS static signals may be combined with the reference IMU field data to obtain an emulated inertial sensor signal for MEMS inertial sensors, as depicted in FIG. 2. In one example embodiment, the gravity part in the vertical accelerometer output may be removed from the static error data. In another example embodiment, the projection of the Earth rotation rate to the MEMS gyros may also be removed from the static error signal. Therefore, the emulated inertial sensors signal for MEMS inertial sensors is computed as a sum of the reference sensor signal and static error data of the MEMS inertial sensors. In case the dynamic errors of the MEMS inertial sensors are collected as well, the emulated inertial sensor signal may be computed as a sum of the reference sensor signal, static error data and dynamic error data.

Those of skill in the art may recognize that other types of errors that may be added to the equation.

At step 140, the emulated MEMS inertial sensor data is processed with the real GPS data of the field test to evaluate the MEMS inertial sensor in terms of navigation performance. In one example embodiment, the navigation performance of MEMS IMUs in each test may be evaluated by the average position drift during simulated short-term (e.g., 30 seconds) GPS signal outages. Other methods for evaluation of MEMS inertial sensors know to those of skill in the art may be used in various embodiments. If other MEMS inertial sensors need to be evaluated, step 150, the test may be repeated on the additional MEMS sensors using the same reference field-test data and GPS field-test data. Those of ordinary skill in the art will appreciate that the order of steps in the described method may be modified without departing from the spirit of the invention.

As indicated, the described emulation technique makes use of the reference IMU signals in the field test as the true kinematic inertial signals and uses the MEMS static signals as the MEMS sensor errors. Although the method generates "artificial" field data for MEMS inertial sensors, the original components of the data come from real signals, such as IMU kinematic data 210 and MEMS IMU static data 220 in FIG. 2. Compared to the INS simulator method, the proposed emulation method has real kinematic motion and real GPS signals. Moreover, the errors of the MEMS sensors attached to the real signals are also from real sensor outputs and are not simulated using sensor error models. Those of skill in the art may appreciate that there are many other advantages of the disclosed emulation technique over prior art sensor testing methods.

Figure 3:
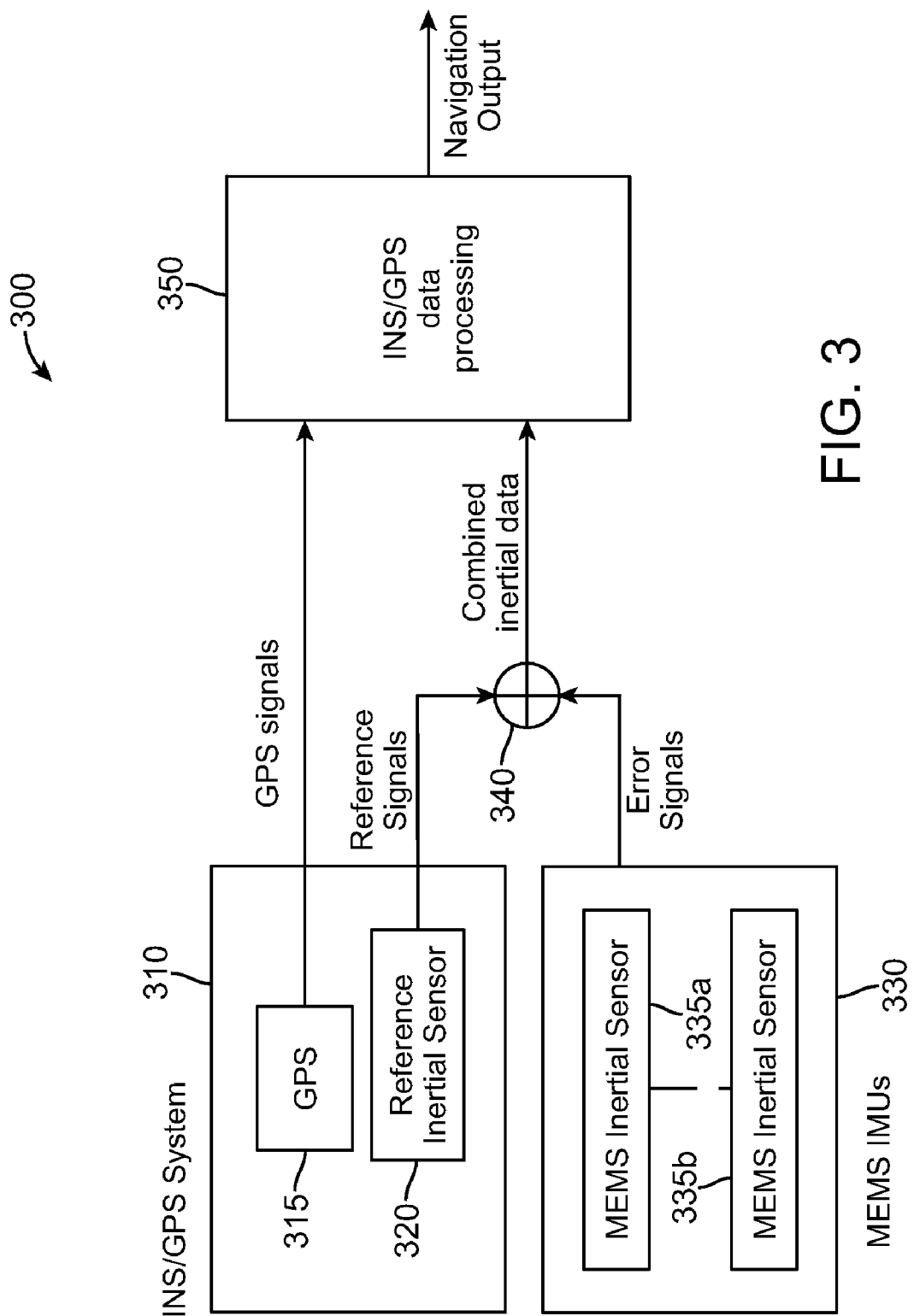
FIG. 3 illustrates a schematic diagram of one example embodiment of a system for evaluating the performance of MEMS inertial sensors.

FIG. 3 depicts one example embodiment of a system for testing performance of MEMS inertial sensors using emulation technique described herein. System 300 may include a INS/GPS multi-sensor system 310 and MEMS IMU 330 coupled to an INS/GPS processing system 350. In one example embodiment, MEMS IMU 330 may include a plurality of inertial sensors 335, such as Crossbow AHRS400CC-100 IMU or other low-grade MEMS sensors manufactured by Crossbow Technology Inc, Analog Devices Inc. or others. INS/GPS multi-sensor system 310 may include a GPS 315 and a reference inertial sensor 320. GPS 315 may include a NovAtel OEM4 GPS receiver or other commercial GPS receiver, such as those manufactured by Honeywell International Inc., Motorola Inc. or others. Reference sensor 120 may include a high-quality inertial sensor, such as Honeywell CIMU with a gyro bias of 0.005 deg/h, a tactical-grade inertial sensor, such as Honeywell HG1700 IMU or others. The INS/GPS data processing system 350 may include a computer running Aided Inertial Navigation System (AINS) toolbox for MatLab® or other type of testing software known to those of skill in the art.

The performance of the emulation technique was tested by applying it to two different MEMS inertial sensors in three different field tests. The navigation results of the emulated MEMS field datasets were compared to the corresponding real MEMS field datasets during several GPS signal outages. Each test included a GPS, a high-quality reference IMU and a MEMS IMU. A Honeywell CIMU with a gyro bias of 0.005 deg/h was used as a high-quality reference IMU. Two tested MEMS IMUs included a high-end commercial IMU (Crossbow AHRS400CC-100) and a low-end MEMS IMU that was developed by the Mobile Multi-Sensor Systems (MMSS) research group at the University of Calgary (U of C) using MEMS sensors from Analog Devices Inc., (ADI). Table 1 gives a summary of the specifications for both low-end and high-end IMUs.

TABLE 1

Specification of the Sample MEMS Inertial Sensors

| Inertial Sensor | Characteristic | Low-Grade IMU | |
|---|---|---|---|
| | | Low-End | High-End |
| Gyro | Bias | <0.5 deg/s | <1.0 deg/s |
| | Bias instability | 40 deg/h (100 s) | 7.2 deg/h (100 s) |
| | White noise (ARW) | 3 deg/√h | <2.25 deg/√h |
| | Bandwidth | 40 Hz | >25 Hz |
| | Scale factor error | 0.1% | <1% |
| | Non-linearity | 0.1% | <0.3% |
| Accelerometer | Bias | <6 mg | <8.5 mg |
| | Bias instability | 0.2 mg (100 s) | 0.015 mg (100 s) |
| | White noise (VRW) | 0.14 m/s/√h | <0.1 m/s/√h |
| | Bandwidth | 32 Hz | >10 Hz |
| | Scale factor error | 0.1% | <1% |
| | Non-linearity | 0.2% | <1% |

Table 2 summarizes the used field test datasets while FIGS. 4-6 illustrate their conducted trajectories. With such an arrangement of field tests, the emulation technique was tested for different MEMS IMUs and different dynamics (trajectories). This may be helpful to draw a general conclusion for the performance of the emulation technique.

TABLE 2

Datasets of the Conducted Field Tests

| | Trajectory | MEMS IMU |
|---|---|---|
| Dataset #1 | Highway (small loop) | Low-End IMU |
| Dataset #2 | Highway (large loop) | Low-End IMU |
| Dataset #3 | L-shaped | High-End IMU |

The INS/GPS data processing software used in the testing included Aided Inertial Navigation System (AINS) toolbox for MatLab®, which was run on Windows-based computer system. The navigation performance of MEMS IMUs in each test was evaluated by the average position drift in 8 simulated 30 second GPS signal outages. The MEMS IMUs emulation results were then compared to the corresponding real field test results to determine effectiveness of the emulation technique described herein.

Figure 7:
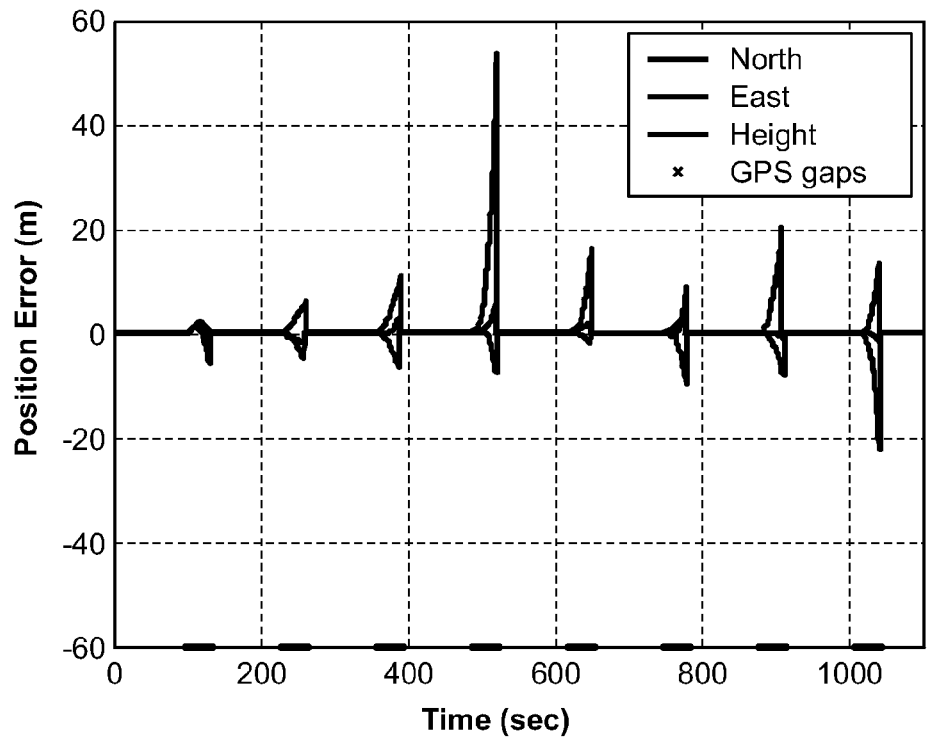
FIG. 7 illustrates example field test data position errors of MEMS inertial sensor during GPS signal outages.
Figure 8:
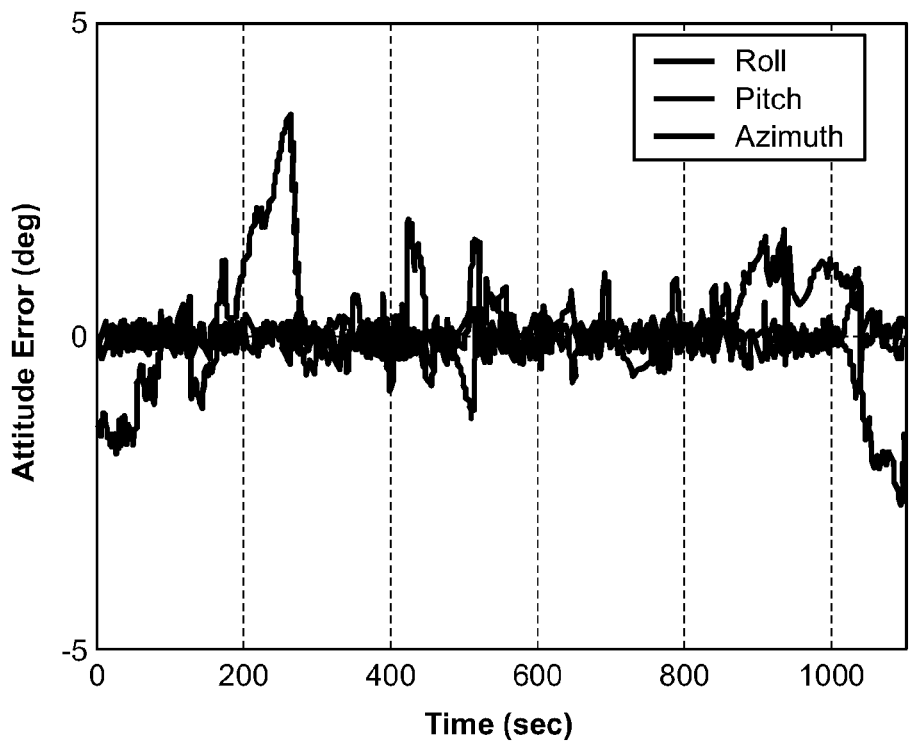
FIG. 8 illustrates example field test data attitude errors of MEMS inertial sensor during GPS signal outages.
Figure 9:
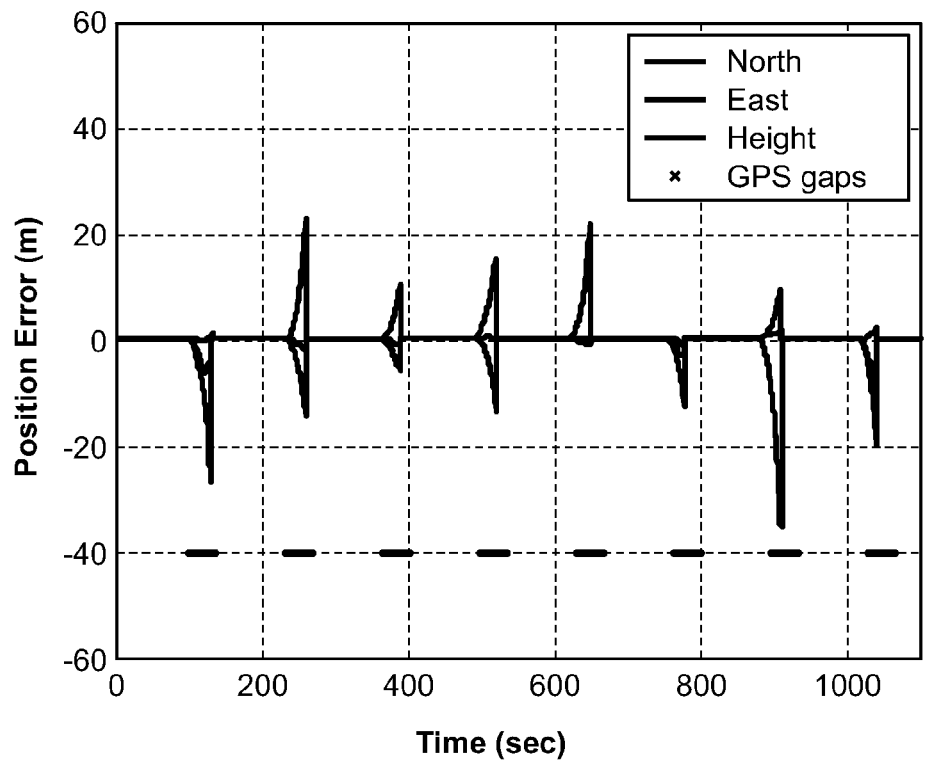
FIG. 9 illustrates example emulated data position errors of MEMS inertial sensor during GPS signal outages.
Figure 10:
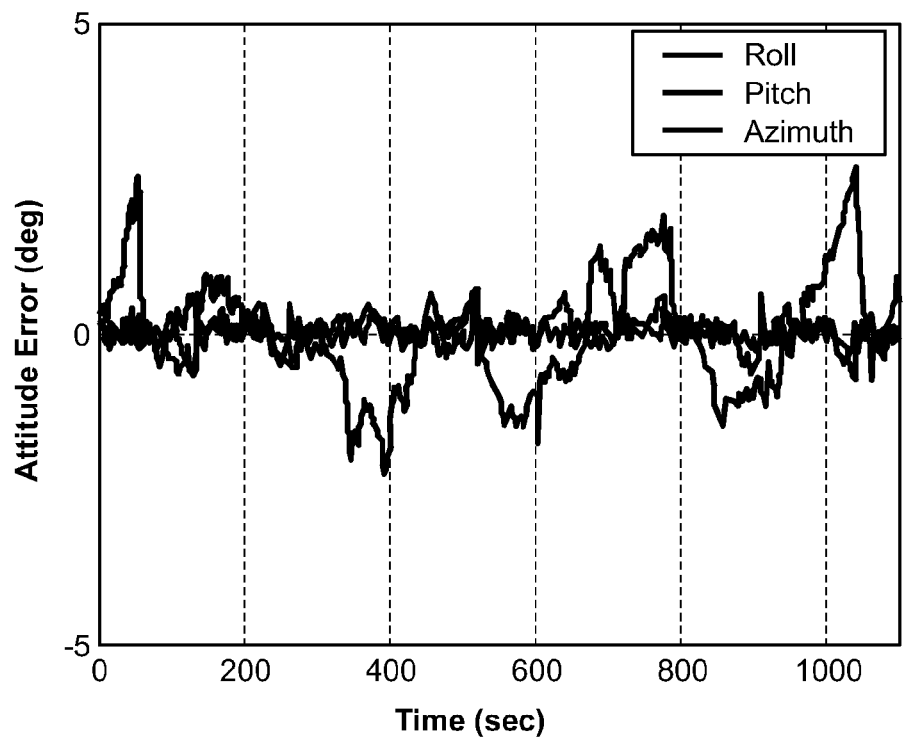
FIG. 10 illustrates example emulated data attitude errors of MEMS inertial sensor during GPS signal outages.

First, the emulation method was applied to the low-end MEMS IMU (Dataset #1). FIGS. 7 and 8 show the position errors and attitude errors of the low-end IMU/GPS solution (using the real field data) with 30 second simulated GPS signal outages. The average position error at the end of the GPS outages is about 30 meters while the attitude RMS error over the whole test is about (0.2, 0.2, 1.2) deg for roll, pitch and azimuth respectively (which is the typical performance of MEMS IMUs). FIGS. 9 and 10 show results of the emulation of the low-end IMU using technique described herein. Table 3 summarizes the comparison of real and emulated test results for low-end MEMS IMU.

TABLE 3

Low-End IMU (Dataset #1) Obtained Results during GPS Signal Outages (Using Actual and Emulated IMU Field Data)

| | Real Data | Emulated Data | Difference |
|---|---|---|---|
| Mean of 3D Position Drift after 30 second GPS Signal Outages | 28.3 m | 23.7 m | 16% |
| RMS of 3D Attitude Errors | 1.25 deg | 0.90 deg | 28% |

As evidenced by the above results, the 3D position drifts and attitude errors of the actual and emulated data are similar in general. However, the emulation results have slightly smaller errors than the real data results, also with less variation. This is due to two reasons: The first reason is that the emulation method does not consider the effect of dynamic errors of the inertial sensors. These dynamic errors typically cause additional navigation errors during vehicle dynamics. This can be solved by modifying the emulation method to take the sensors dynamic errors into account. The second reasons is that the static MEMS sensor signals used for the emulation were collected in the lab where the temperature is relatively stable. In this case, the bias variation due to temperature will be smaller than the case of field data. This can be improved by collecting the static signals of MEMS IMUs under temperature conditions that are similar to those in the field, such as outdoors or in a temperature room.

Second, the emulation method was applied to the low-end IMU (Dataset #2) to check if the emulation method is sensitive to different datasets. In this test, single-ended GPS position was used for updating instead of differential GPS that was used in the first dataset. The Dataset #2 results are shown in Table 4. In this case, the difference in the mean 3D position drift during GPS signal outages between actual and emulated data is 25%, which indicates again the efficiency of the emulation method and that the method is not sensitive to different datasets. It can be observed that the position and attitude errors of both the real and emulation data are larger than those of Dataset #1. This is due to the single-ended GPS update and the absence of dynamics in this dataset, and thus these larger errors are not related to the application of the emulation method itself.

TABLE 4

Low-end IMU (Dataset #2) Obtained Results during GPS Signal Outages (Using Actual and Emulated IMU Field Data)

| | Real Data | Emulated Data | Difference |
|---|---|---|---|
| Mean of 3D Position Drift after 30 second GPS Signal Outages | 36.6 m | 27.6 m | −25% |
| RMS of 3D Attitude Errors | 1.58 deg | 1.10 deg | −30% |

Third, the emulation method was applied to high-end MEMS IMUs (Dataset #3). The corresponding results are shown in Table 5. The difference in the mean 3D position drifts between the actual and emulated data results is 35%, which is larger than the corresponding results of the low-end IMU case (i.e., Datasets #1 and #2). This could be due to the fact that the low-end IMU was mounted inside the test vehicle during the two corresponding field tests while the high-end IMU was mounted on top of the vehicle. In this case, the high-end IMU suffered from larger temperature changes than the low-end IMUs. Hence, the static signals of the high-end IMU collected in the lab did not fully represent the sensor errors in the field (especially the thermal drift of the biases).

TABLE 5

High-End IMU (Dataset #3) Obtained Results during GPS Signal Outages (Using Actual and Emulated IMU Field Data)

| | Real Data | Emulated Data | Difference |
|---|---|---|---|
| Mean of 3D Position Drift after 30 second GPS Signal Outages | 8.6 m | 5.6 m | −35% |
| RMS of 3D Attitude Errors | 0.33 deg | 0.19 deg | −42% |

Figure 11:
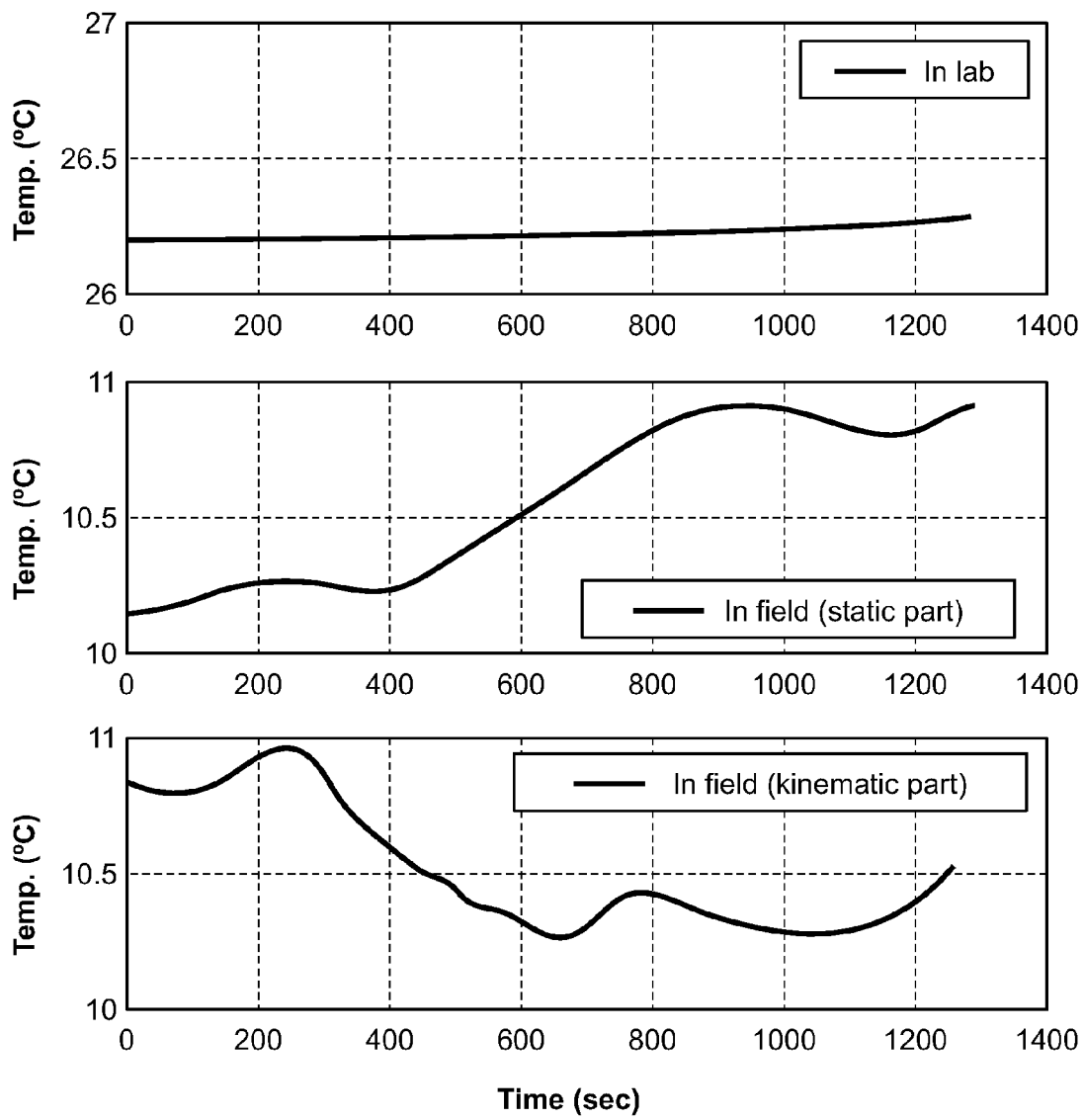
FIG. 11 illustrates data temperature changes in the lab and in the field of a high-end MEMS IMU.

To investigate the validity of the above analysis, a long period of the initial static alignment signal (more than 20 minutes) of the high-end IMU in Dataset #3 was used as the static signals for emulation. The relevant temperature variation is similar to that of the kinematics test part as shown in FIG. 11. The results in this case are given in Table 6, which indicates that the mean of the 3D position drift difference between the actual and new emulated data is only 3%. In addition, the emulation data obtained errors are even slightly larger than the real data results (in contrast to all previous obtained results). Therefore, using static MEMS IMU signals collected outdoors or in the field (instead of the lab) improves the emulation results significantly. This is especially true in cases where the MEMS IMU experiences large temperature changes in the field.

TABLE 6

High-End IMU (Dataset #3) Obtained Results during GPS Signal Outages (Using Actual Field Data and Emulated IMU Data Collected in the Field)

| | Real Data | Emulated Data | Difference |
|---|---|---|---|
| Mean of 3D Position Drift after 30 second GPS Signal Outages | 8.6 m | 8.9 m | +3% |
| RMS of 3D Attitude Errors | 0.33 deg | 0.46 deg | +39% |

In summary, the results of the above emulation tests indicate that the mean position drift after several 30 second GPS outages are different from the corresponding actual case by about 20%. This proves that the emulation technique disclosed herein is an effective method for evaluating the performance of any MEMS IMU.

In the interest of clarity, not all features of the implementations of the emulation technique for MEMS inertial sensor testing are shown and described. It will, of course, be appreciated that in the development of any such actual implementation of the emulation technique, numerous implementation-specific decisions must be made in order to achieve the developer's specific goals, such as compliance with application-, system-, device- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of computer systems having the benefit of this disclosure.

In accordance with this disclosure, the components, process steps, and/or data structures described herein may be implemented using various types of operating systems, computing platforms, peripheral or embedded devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium.

Furthermore, it should be noted that systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or other means suitable for the purposes described herein.

Those of ordinary skill in the art will realize that the description of the system and methods for MEMS inertial sensor testing are illustrative only and are not intended to be in any way limiting. Other embodiments will readily suggest themselves to those of ordinary skill in the art having the benefit of this disclosure. Further more, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for evaluating performance of MEMS inertial sensors comprising:
   field-testing a reference inertial sensor to generate reference field-test data including a real kinematic inertial signal from the field-testing, operating conditions experienced by the reference inertial sensor during the field-testing, and GPS signal conditions experienced by the reference inertial sensor during the field-testing;
   lab-testing a plurality of MEMS inertial sensors to generate static error data for each tested MEMS inertial sensor;
   calculating a sum of the reference field-test data and the static error data for each MEMS inertial sensor to generate an emulated field data for each MEMS inertial sensor, and calculating an average position drift during a GPS signal outage; and
   processing, with a processor, the emulated field data for each MEMS inertial sensor with a GPS field data to evaluate performance of the plurality of MEMS inertial sensors for characterizing how the MEMS inertial sensor will operate during varied GPS signal conditions.

2. The method of claim 1, wherein the reference inertial sensor includes a high-grade inertial sensor and the MEMS inertial sensors include low-grade inertial sensors.

3. The method of claim 1, wherein the field test includes testing of one or more of general trajectories, driving conditions and GPS signal conditions.

4. The method of claim 1, wherein the lab-testing includes varying temperature conditions of the tested MEMS inertial sensors.

5. The method of claim 1, wherein the static error data is being collected for a period longer than the duration of the field test.

6. The method of claim 1, further comprising removing gravity effect from the static error data before combining the static error data with the reference field-test data.

7. The method of claim 1, further comprising removing the Earth rotation rate effect from the static error data before combining the static error data with the reference field-test data.

8. A method for evaluating performance of MEMS inertial sensors comprising:
   field-testing a reference inertial sensor to generate reference field-test data including a real kinematic inertial signal from the field-testing, operating conditions experienced by the reference inertial sensor during the field-testing, and GPS signal conditions experienced by the reference inertial sensor during the field-testing;
   testing a plurality of MEMS inertial sensors to generate static and dynamic error data for each tested MEMS inertial sensor;
   calculating a sum of the reference field-test data and the static and dynamic error data for each MEMS inertial sensor to generate an emulated field data for each MEMS inertial sensor, and calculating an average position drift during a GPS signal outage; and
   processing, with a processor, the emulated field data for each MEMS inertial sensor with a GPS field data to evaluate performance of the plurality of MEMS inertial sensors for characterizing how the MEMS inertial sensor will operate during varied GPS signal conditions.

9. The method of claim 8, wherein the reference inertial sensor includes a high-grade inertial sensor and the MEMS inertial sensors include low-grade inertial sensors.

10. The method of claim 8, wherein the field test includes testing of one or more of general trajectories, driving conditions and GPS signal conditions.

11. The method of claim 8, wherein the lab-testing includes varying temperature conditions of the tested MEMS inertial sensors.

12. The method of claim 8, wherein the static and dynamic error data is being collected for a period longer than the duration of the field test.

13. The method of claim 8, further comprising removing gravity effect from the static and dynamic error data before combining the static and dynamic error data with the kinematic field-test data.

14. The method of claim 8, further comprising removing the Earth rotation rate effect from the static and dynamic error data before combining the static and dynamic error data with the kinematic field-test data.

15. A method for evaluating performance of MEMS inertial sensors comprising:
   receiving kinematic field-test data of a reference inertial sensor;
   receiving static error data for a MEMS inertial sensor;
   calculating a sum of the kinematic field-test data and the static error data for the MEMS inertial sensor to generate an emulated field data for the MEMS inertial sensor, and calculating an average position drift during a GPS signal outage; and
   processing, with a processor, the emulated field data for the MEMS inertial sensor with a GPS field data to evaluate performance of the MEMS inertial sensors for characterizing how the MEMS inertial sensor will operate during varied GPS signal conditions.

16. The method of claim 15, wherein the reference inertial sensor includes a high-grade inertial sensor and the MEMS inertial sensors include low-grade inertial sensors.

17. The method of claim 15, wherein the static error data exceeds the kinematic field-test data.

18. The method of claim 15, wherein the receiving static error data further includes receiving dynamic error data for a MEMS inertial sensor.

19. The method of claim 18, further comprising combining the dynamic error data with the kinematic field-test data and the static error data.

20. The method of claim 19, further comprising removing gravity effect from the static and dynamic error data before combining the static and dynamic error data with the kinematic field-test data.

21. The method of claim 19, further comprising removing the Earth rotation rate effect from the static and dynamic error data before combining the static and dynamic error data with the kinematic field-test data.

22. A system for evaluating performance of MEMS inertial sensors comprising:
   a reference inertial sensor operable to generate reference field-test data;
   a plurality of MEMS inertial sensors operable to generate static error data;
   a signal combiner operable to calculate a sum of the reference field-test data and the static error data for each MEMS inertial sensor to generate emulated field data for each MEMS inertial sensor; and
   a processor configurable to evaluate performance of the plurality of MEMS inertial sensors by processing the emulated field data for each MEMS inertial sensor with a GPS field data, wherein an average position drift during a GPS signal outage is used to characterize how the MEMS inertial sensor will operate during varied GPS signal conditions.

23. The system of claim 22, wherein the reference inertial sensor includes a high-grade inertial sensor and the MEMS inertial sensors include low-grade inertial sensors.

24. The system of claim 22, wherein the static error data exceeds the reference field-test data.

25. The system of claim 22, wherein the plurality of MEMS inertial sensors are further operable to generate dynamic error data.

26. The system of claim 25, wherein the signal combiner is further operable to combine the reference field-test data, the static error data and the dynamic error data.

* * * * *

UNITED STATES PATENT AND TRADEMARK OFFICE
CERTIFICATE OF CORRECTION

| | | |
|---|---|---|
| PATENT NO. | : 8,359,182 B2 | Page 1 of 1 |
| APPLICATION NO. | : 12/109923 | |
| DATED | : January 22, 2013 | |
| INVENTOR(S) | : Niu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this
Fourth Day of November, 2014

Michelle K. Lee
*Deputy Director of the United States Patent and Trademark Office*